(Model.)

J. GRAVES, A. W. & W. PARTRICK.
Kitchen Table.

No. 232,401. Patented Sept. 21, 1880.

Witnesses
Nat. E. Oliphant,
Geo. R. Porter

Inventors
John Graves,
Alfred W. Partrick,
William Partrick.
per Chas. H. Fowler,
Attorney.

UNITED STATES PATENT OFFICE.

JOHN GRAVES, OF EAST ORANGE, ALFRED W. PARTRICK, OF NEWARK, NEW JERSEY, AND WILLIAM PARTRICK, OF SING SING, NEW YORK.

KITCHEN-TABLE.

SPECIFICATION forming part of Letters Patent No. 232,401, dated September 21, 1880.

Application filed March 3, 1880. (Model.)

*To all whom it may concern:*

Be it known that we, JOHN GRAVES, ALFRED W. PARTRICK, and WILLIAM PARTRICK, citizens of the United States, residing, respectively, at East Orange, in the county of Essex and State of New Jersey, Newark, in the county of Essex, State of New Jersey, and Sing Sing, in the county of Westchester and State of New York, have invented certain new and useful Improvements in Kitchen-Tables; and we do hereby declare that the following is a full, clear, and exact description of the same, reference being had to the annexed drawings, making a part of this specification, and to the letters and figures of reference marked thereon.

Figure 1:
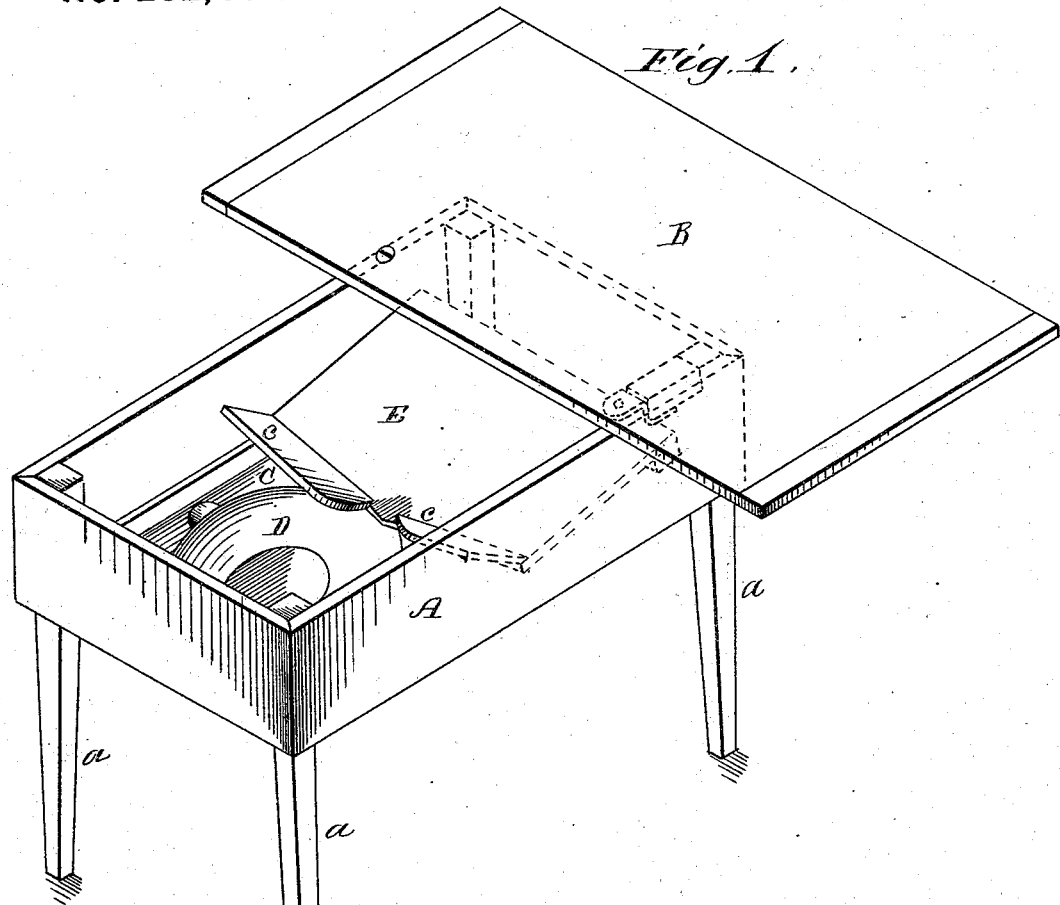
Figure 2:
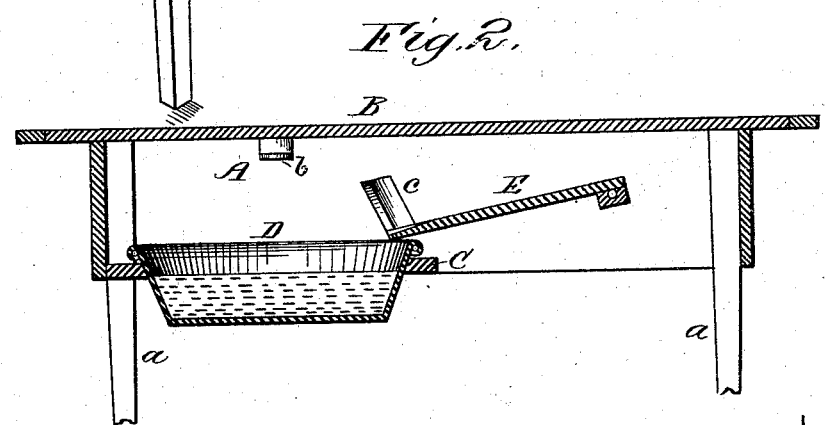

Figure 1 of the drawings represents a perspective view of our invention, with the leaf of the table swung around at right angles to its length; and Fig. 2, a central section, showing the leaf of the table closed.

This invention has relation to that class of kitchen-tables provided with a pivoted leaf to close over the frame thereof, but capable of being moved around to obtain access to the interior of the frame of the table, where is arranged and supported a pan for containing water to wash dishes in.

The object of the invention is not only to provide such table with a pivoted leaf and wash-pan, but a special form of bracket pivoted within and to the sides of the table-frame, whereby the dishes, after being washed, are quickly and effectually drained previously to their being dried, as will be hereinafter described.

In the accompanying drawings, A represents the frame of the table, supported by suitable legs $a$, said frame having pivoted thereto a leaf, B, so that when access to the interior of the frame A is desired the leaf is swung around in position, as illustrated in Fig. 1, a stop, $b$, secured to the under side of the leaf, preventing it from being swung around too far in either direction.

Within the frame A is a shelf, C, for supporting a dish-pan, D, to contain water, said pan fitting down into a circular opening in the shelf.

A bracket, E, is pivoted to the sides of the table-frame, and when resting at its free end upon the edge of the dish-pan D it will be in an inclined position, as shown in Fig. 2.

The bracket E, at its free end, has inclined supports $c$, of sufficient height to support the dishes as they are taken from the pan D, so that they can be properly drained before being dried.

As the dishes are removed from the pan D they are placed on their edges, resting against the supports $c$, the incline of the supports conducting the water from the dishes back into the pan, the water passing between the inner edges or ends of the supports.

When it is desired to remove the dish-pan D for emptying its contents, the free end of the pivoted bracket E is raised sufficiently to allow of the pan being lifted out of the opening in the shelf.

Having now fully described our invention, what we claim as new, and desire to secure by Letters Patent, is—

In a kitchen-table having the usual frame A and movable leaf or cover B, the combination, with the shelf C and removable dish-pan D, of the bracket E, pivoted to the inner sides of the table-frame, said bracket having at its front edge supports $c$, inclined at an angle to each other and at an angle to the horizontal plane of the bracket, substantially as and for the purpose set forth.

In testimony that we claim the above we have hereunto subscribed our names in the presence of two witnesses.

JOHN GRAVES.
ALFRED W. PARTRICK.
WILLIAM PARTRICK.

Witnesses:
 ORREN FORD,
 G. E. BARNES.